United States Patent
Bangalore et al.

(10) Patent No.: US 8,560,518 B2
(45) Date of Patent: Oct. 15, 2013

(54) METHOD AND APPARATUS FOR BUILDING SALES TOOLS BY MINING DATA FROM WEBSITES

(71) Applicant: AT&T Intellectual Property II, L.P., Atlanta, GA (US)

(72) Inventors: Srinivas Bangalore, Morristown, NJ (US); Junlan Feng, Basking Ridge, NJ (US); Mazin Gilbert, Warren, NJ (US); Jay Gordon Wilpon, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/690,444

(22) Filed: Nov. 30, 2012

(65) Prior Publication Data
US 2013/0159828 A1    Jun. 20, 2013

Related U.S. Application Data

(63) Continuation of application No. 13/088,935, filed on Apr. 18, 2011, now Pat. No. 8,359,307, which is a continuation of application No. 11/318,183, filed on Dec. 23, 2005, now Pat. No. 7,949,646.

(51) Int. Cl.
*G06F 17/30* (2006.01)

(52) U.S. Cl.
USPC ............ 707/708; 707/726; 709/203; 709/219

(58) Field of Classification Search
USPC ............ 707/726, 708, 710, 999.107, 999.01; 709/203, 219
See application file for complete search history.

(56) References Cited

U.S. PATENT DOCUMENTS

| | | | |
|---|---|---|---|
| 6,094,653 A | 7/2000 | Li | |
| 6,349,309 B1 | 2/2002 | Aggarwal et al. | |
| 6,418,432 B1 | 7/2002 | Cohen et al. | |
| 6,618,717 B1 | 9/2003 | Karadimitriou et al. | |
| 6,640,224 B1 | 10/2003 | Chakrabarti | |
| 6,883,137 B1 | 4/2005 | Girardot et al. | |
| 7,340,464 B2 | 3/2008 | Kelliher et al. | |
| 7,363,279 B2 | 4/2008 | Ma et al. | |
| 7,596,552 B2 * | 9/2009 | Levy et al. ............................ | 1/1 |
| 7,870,039 B1 * | 1/2011 | Dom et al. ................. | 705/26.41 |
| 7,930,631 B2 | 4/2011 | Sahota et al. | |
| 2002/0138487 A1 | 9/2002 | Weiss et al. | |
| 2003/0135825 A1 | 7/2003 | Gertner et al. | |
| 2004/0030741 A1 | 2/2004 | Wolton et al. | |
| 2005/0022115 A1 | 1/2005 | Baumgartner et al. | |
| 2005/0050086 A1 | 3/2005 | Liu et al. | |
| 2005/0114672 A1 | 5/2005 | Duncan et al. | |
| 2005/0193335 A1 | 9/2005 | Dorai et al. | |
| 2005/0234953 A1 | 10/2005 | Zhang et al. | |

(Continued)

*Primary Examiner* — Leslie Wong
(74) *Attorney, Agent, or Firm* — Wolff & Samson, PC

(57) ABSTRACT

A website mining tool is disclosed that extracts information from, for example, a company's website and presents the extracted information in a graphical user interface (GUI). In one embodiment, web pages from a website are stored in, for example, computer memory and a structure of the web pages is identified. A plurality of blocks of information is then extracted as a function of this structure and a category is assigned to each block of information. The elements in the blocks of information are then displayed, for example to a salesperson, as a function of these categories. In another embodiment, Document Object Modeling parsing is used to identify the structure of the web pages. In yet another embodiment, a support vector machine is used to categorize each block of information.

20 Claims, 8 Drawing Sheets

(56) References Cited

U.S. PATENT DOCUMENTS

| | | |
|---|---|---|
| 2005/0267935 A1 | 12/2005 | Gandhi et al. |
| 2006/0242192 A1* | 10/2006 | Musgrove et al. ............ 707/102 |
| 2007/0022085 A1 | 1/2007 | Kulkarni |
| 2007/0050708 A1 | 3/2007 | Gupta et al. |
| 2007/0094267 A1 | 4/2007 | Good et al. |
| 2007/0106627 A1* | 5/2007 | Srivastava et al. .............. 706/20 |
| 2007/0143283 A1 | 6/2007 | Spencer et al. |
| 2011/0185273 A1 | 7/2011 | DaCosta et al. |

* cited by examiner

301

401

| Task Complexity | Pages --- 2720 |
| | Info-Blocks --- 110389 |
| | Terms --- 12147 |
| | Hyperlinks --- 184841 |
| | Sentences --- 192614 |
| Contact Us | |
| Acronyms | |
| Products | |
| FAQ Pages | |

FIG. 4

| Task Complexity | |
|---|---|
| Contact Us | |
| Acronyms | [bart]----- bay area rapid transit<br>[PDRC]----- permanent display removable computer<br>[ntsc]----- national technical support center<br>[pdf]----- portable document format<br>[SDoC]----- s declaration of conformity<br>[TCB]----- telecommunications certification body<br>[FCC]----- federal communications commission<br>[SDK]----- software development kit<br>[aca]----- american chiropractic association<br>[CVI]----- continuous varying incidence<br>[EDL]----- equivalent duct length<br>[HVI]----- home ventilating institute<br>[GFCI]----- ground fault circuit interrupter<br>[ISO]----- international standards organization<br>[PSC]----- permanent split capacitor<br>[cfl]----- compact fluorescent lamp<br>[cri]----- color rendition index<br>[OHCA]----- off hook call announce<br>[slt]----- single line telephones<br>[TAFAS]----- trunk answer from any station<br>[smdr]----- station message detail recording<br>[DND]----- do not disturb<br>[DSS]----- direct station selection<br>[DID]----- direct inward dialing<br>[DIL]----- direct in lines<br>[cos]----- class of service<br>[CPC]----- calling party control<br>[bss]----- busy station signaling<br>[ARS]----- automatic route selection<br>[DISA]----- direct inward system access<br>[VPN]----- virtual private network<br>[ED]----- extra-low dispersion<br>[sle]----- sound level equalizer<br>[CCP]----- customer care plans<br>[ARF]----- advanced recycling fee<br>[srf]----- solar refreshing filter<br>[DOE]----- department of energy<br>[EPA]----- environmental protection agency<br>[ISP]----- internet service provider<br>[VAS]----- voice activated system<br>[SFC]----- sound field control<br>[dbs]----- digital business systems |
| Products | |
| FAQ Pages | |

METHOD AND APPARATUS FOR BUILDING SALES TOOLS BY MINING DATA FROM WEBSITES

This application is a continuation of prior U.S. patent application Ser. No. 13/088,935 filed Apr. 18, 2011, which is a continuation of prior U.S. patent application Ser. No. 11/318,183 filed Dec. 23, 2005 which issued as U.S. Pat. No. 7,949,646 on May 24, 2011, each of which is incorporated herein by reference in their entirety.

BACKGROUND OF THE INVENTION

This application relates generally to websites and, more particularly, to mining websites for information.

In many types of sales environments, it is desirable for a salesperson to understand various aspects of a customer or potential customer prior to a sales call or visit. Websites associated with the customer as well as those of any competitors of the customer frequently provide a convenient method of obtaining such information. Corporate websites typically require significant time and effort to design and are often designed based on a thorough analysis of the market of the company and the competitive landscape. Typically, such sites, among other things, describe general information about the company, the products and services the company provides, contact information, as well as a large variety of e-commerce or customer care applications. All of this information is relevant to a salesperson's understanding of a corporation. However, when these websites are large, or the salesperson is limited by time, reading through a company's website to obtain this information is often not practical.

Software tools useful for extracting information from websites are known. Some such tools typically either download all or desired portions of websites for off-line viewing. Other tools, known as crawlers, visit websites and scan the website pages content and other information in order to create entries for an index. Entire sites or specific pages can be indexed and selectively visited. Thus, a map of a website can be created or information on that website can be searched by referring to the index.

SUMMARY OF THE INVENTION

The present inventors have recognized that, while prior tools for extracting information from websites were advantageous in many aspects, they were also limited in certain regards. Specifically, while such tools were capable of downloading or indexing entire web pages, these tools were not able to extract information relevant to the sales function in the most efficient manner. These tools also were unable to provide information in a manner that would permit a salesperson to quickly gain an overall understanding of the products, services and other relevant information of the potential customer.

The present invention substantially solves these problems. In accordance with the present invention, a website mining tool extracts information from, for example, a company's website and presents the extracted information in a graphical user interface (GUI). In one embodiment, web pages from a website are loaded in, for example, computer memory and a structure of the web pages is identified. A plurality of blocks of information is then extracted as a function of this structure and a category is assigned to each block of information. The elements in the blocks of information are then displayed, for example to a salesperson, as a function of these categories. In another embodiment, Document Object Modeling parsing is used to identify the structure of the web pages. In yet another embodiment, a support vector machine is used to categorize each block of information.

These and other advantages of the invention will be apparent to those of ordinary skill in the art by reference to the following detailed description and the accompanying drawings.

BRIEF DESCRIPTION OF THE DRAWINGS

FIG. 4 shows an expanded view of a first category of the information extracted from a website;

FIG. 6 shows an expanded view of a third category of the information extracted from a website;

DETAILED DESCRIPTION

Figure 1:
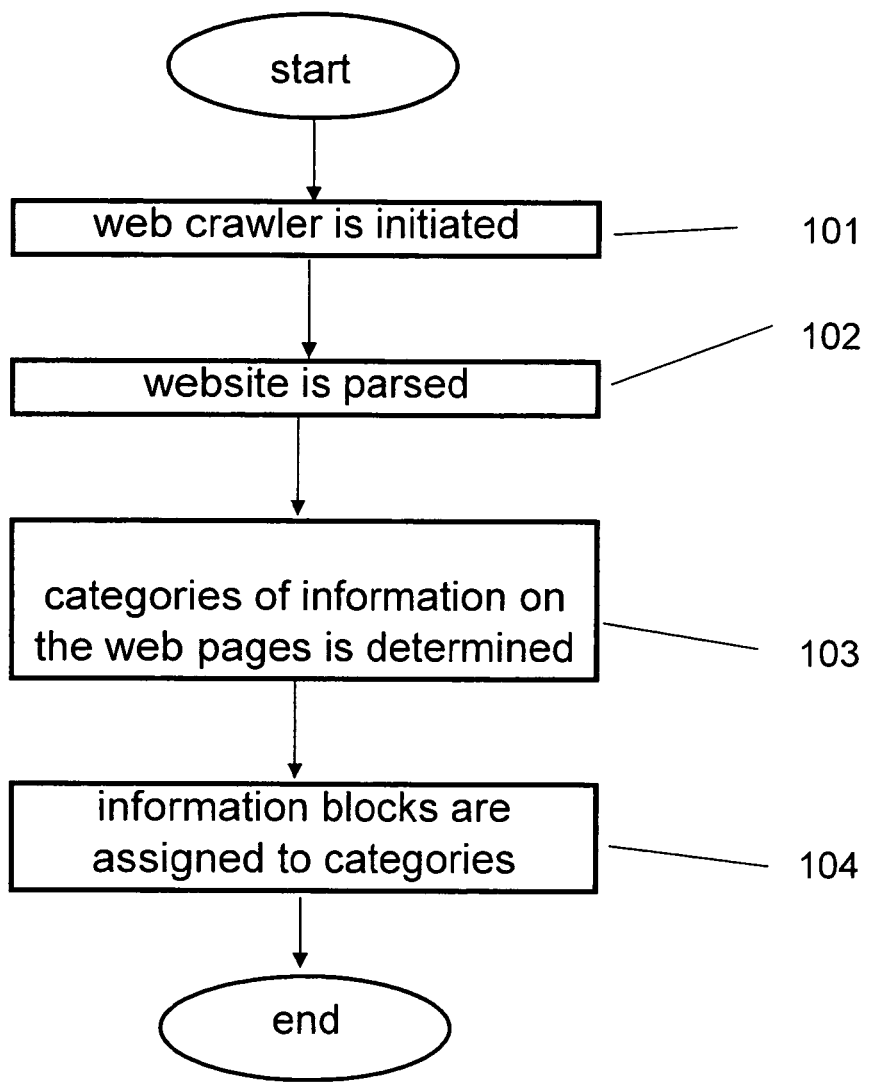
FIG. 1 shows one illustrative method in accordance with the principles of the present invention.

FIG. 1 shows a method in accordance with the principles of the present invention whereby information is extracted from a corporate website and is organized for display to a salesperson. At step 101 a web crawler is initiated by entering, for example, the address of a website to be analyzed. A web crawler is an automated program that accesses a website, traverses the site by following the links present on the pages of the site, and downloads the web pages to local disks. The content of these pages are then, for example, loaded into computer memory. Next, at step 102, the Web pages then are parsed in order to obtain information regarding the structure of the page. Illustratively, Document Object Model (DOM) parsing may be used to obtain this structure information. DOM is a cross-language application programming interface standardized by the World Wide Web Consortium (W3C) for accessing and modifying extensible markup language (XML) documents. DOM parsing involves parsing multiple pages of a website that are, for example, stored in computer memory, and converting them into a hierarchical tree. Such DOM parsing is well-known in the art and will not be described further herein. The result of such parsing is that the structural hierarchy of a website is determined.

Once the hierarchical structure of a webpage is known, then at step 103 the categories of information on the web pages are determined to facilitate understanding of the content of the website. As discussed previously, typical corporate websites present information on multiple web pages. Information conveyed on websites can be identified not only by the structure of the links between pages, but also by the semantic structure of these pages. Therefore, in order to identify these links, in accordance with one embodiment of the present invention, desired categories of information are identified into which the information blocks on a web page are categorized. An information block is defined as a coherent topic area according to its content. Illustratively, the different semantic categories for classifying web page information blocks may include page titles, forms, table data, frequently asked questions/answers, contact numbers, bulleted lists, headings, heading lists, heading content, and other such categories.

Once such categories of information are identified, at step 104 information blocks are assigned to those categories. Such category assignment may be considered a binary classification problem. Specifically, for each pair of information blocks, a set of features is developed to represent the difference between them, and then the feature set is classified into the information block boundary class or the non-boundary class. The two information blocks in the pair are separated into two distinct information blocks if a boundary is identified between them. In order to identify the boundaries between such classifications, a learning machine such as a Support Vector Machine (SVM) is illustratively used. An SVM is an algorithm that is capable of determining boundaries in a historical data pattern with a high degree of accuracy. As is known in the art, SVMs are learning algorithms that address the general problem of learning to discriminate between classes or between sub-class members of a given class. SVMs have been found to be much more accurate than prior methods of classifying information blocks due to the SVM's ability to select an optimal separating boundary between classifications when many candidate boundaries exist. SVMs are well known and the theory behind the development and use of such SVMs will not be discussed further herein. One skilled in the art will recognize that many different categorization methods may be used to identify the boundaries between classifications, as described above with equally advantageous results. The end result, however, is that distinct information blocks on a website are accurately categorized. Referring once again to FIG. 1, once the information blocks have been identified, at step 105 specific elements of information are extracted from those blocks.

Figure 2:
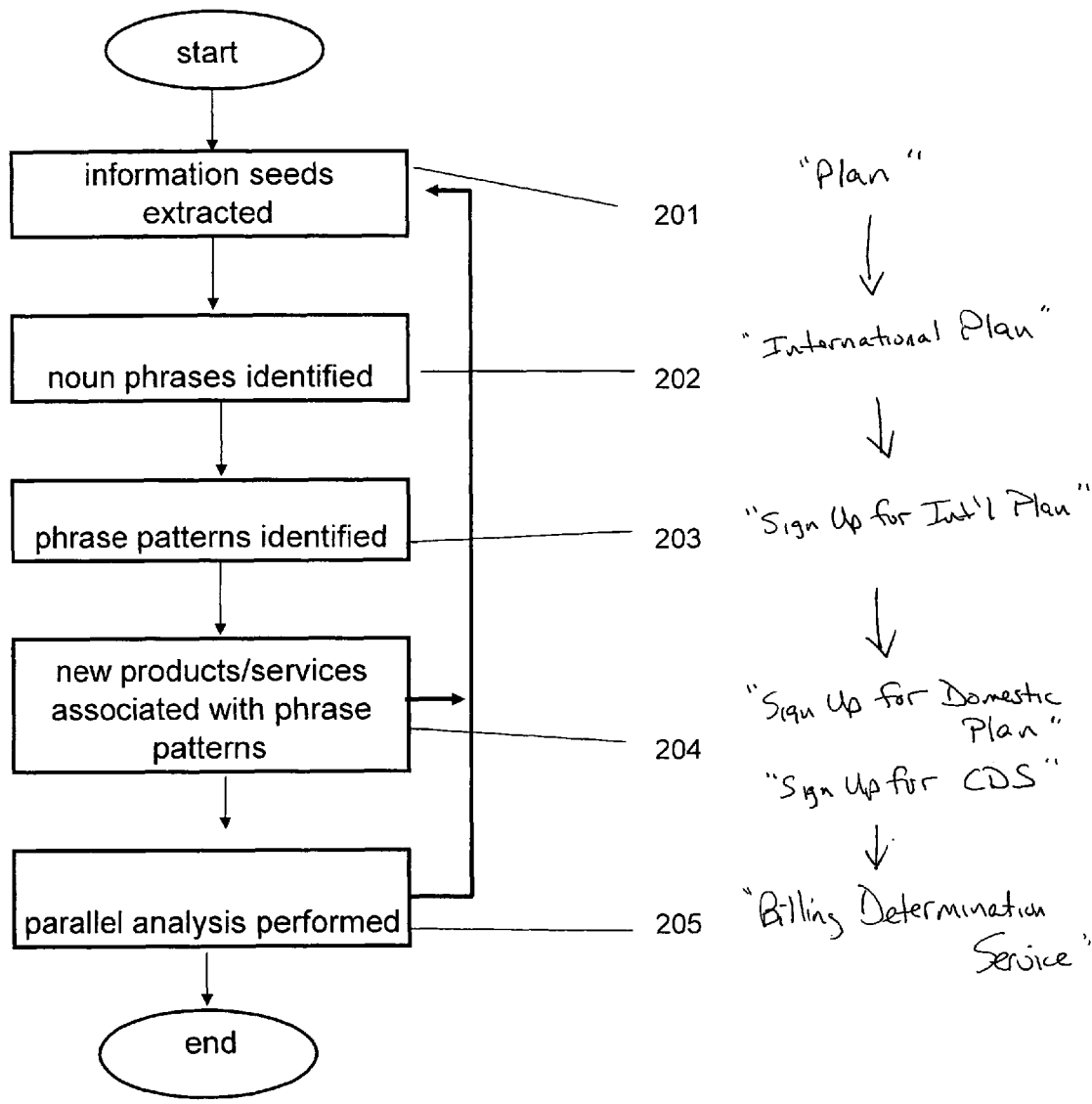
FIG. 2 shows a second illustrative method in accordance with the principles of the present invention.

FIG. 2 shows a method whereby such elements of information are extracted from information blocks. Specifically, FIG. 2 shows how, illustratively, elements of information related to the identified category "Products and Services" are extracted. Specifically, at step 201, product/service text seeds are identified. A seed is, for example, a word or phrase that identifies one class of product/service. Illustratively, the word "Plan" may be identified as a potential seed. As one skilled in the art will recognize, for different information different seeds would be identified. Next, at step 202, after the product/service seeds have been identified, noun phrases ending with the seeds are identified. In this example, the phrase International Plan may be identified. Then, at step 203, patterns associated with the noun phrases and seeds are identified in order to locate new products and services. For example, the phrase "Sign Up for Our International Plan" may be identified as associated with the phrase International Plan. Then, at step 204, new products and services are identified by searching for that phrase. Illustratively, the phrases "Sign up for Our Domestic Plan" and "Sign up for Our Caller Determination Service" are identified, thus identifying two new products/services Domestic Plan and Caller Determination Service (CDS). Once new products and services are identified at step 204, new seeds may be identified at step 201. For example, in the newly-identified illustrative service Caller Determination Service, the new seed "Service" may be identified.

Next, in addition to determining new seeds from identified products and services, at step 205 parallel analysis is used to identify even more products and services. Illustratively, by referring to the phrase Determination Service, a new service named Billing Determination Service is identified. Each time a new product or service is identified, new potential seeds and phrases are identified and other elements of information having those seeds and phrases are identified. This information extraction technique is then applied to each category of information in order to identify and relate elements of information in those categories.

Figure 3:
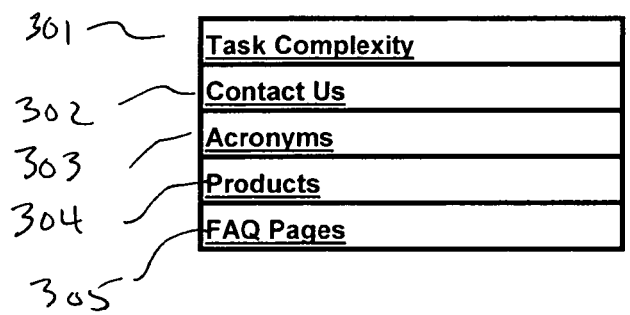
FIG. 3 shows the high level categories of information extracted from a website according to the method of FIGS. 1 and 2.

FIG. 3 shows one illustrative example of how the information extracted from an illustrative website analysis in accordance with the principles of the present invention may be displayed and/or otherwise arranged. Specifically, in a summary display of the results of such an analysis, five headings are shown: Task Complexity 301, Contact Us 302, Acronyms 303, Products 304 and FAQ Pages 305. Task Complexity is, for example, a hyperlink category that is linked to information related to the process of analyzing the website in question. Illustratively, FIG. 4 shows one expanded view of the category Task Complexity obtained by clicking on the Task Complexity hyperlink 301. Referring to FIG. 4, information related to the task of analyzing a website is displayed in FIG. 401, here the number of web pages examined, the number of information blocks identified, the terms within those information blocks that were, for example, seeds or identified phrases obtained as described above, the number of hyperlinks followed in the analysis and the number of sentences examined for relevant terms.

Figure 5:
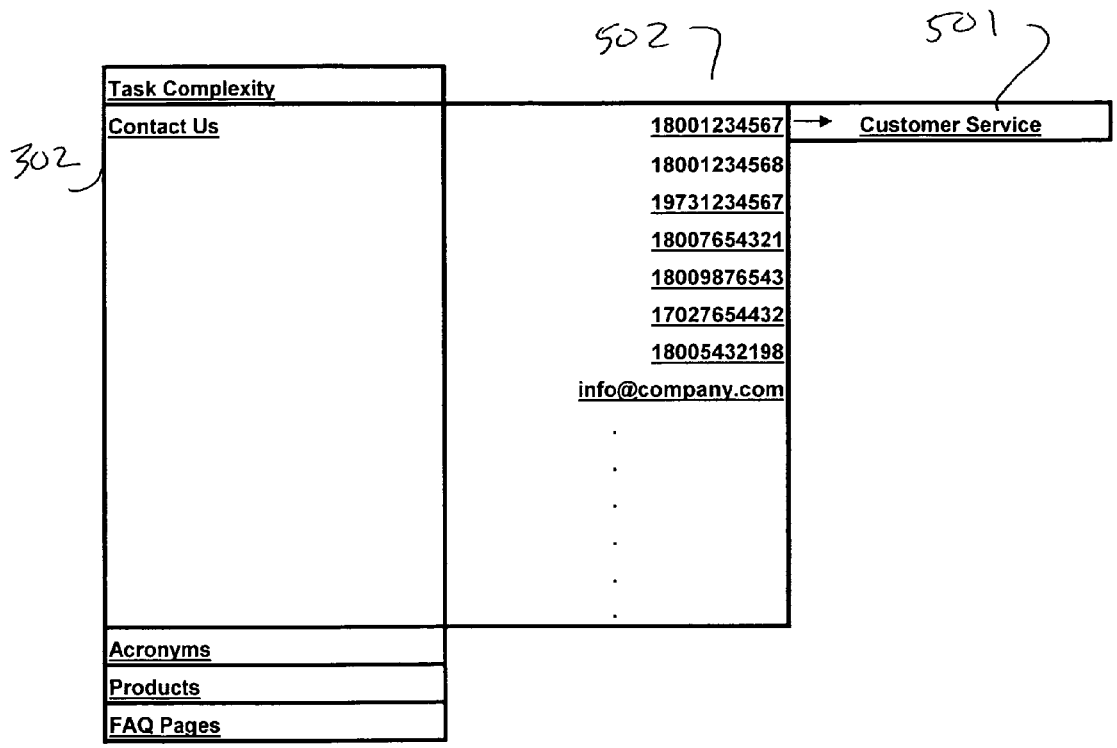
FIG. 5 shows an expanded view of a second category of the information extracted from a website.
Figure 7:
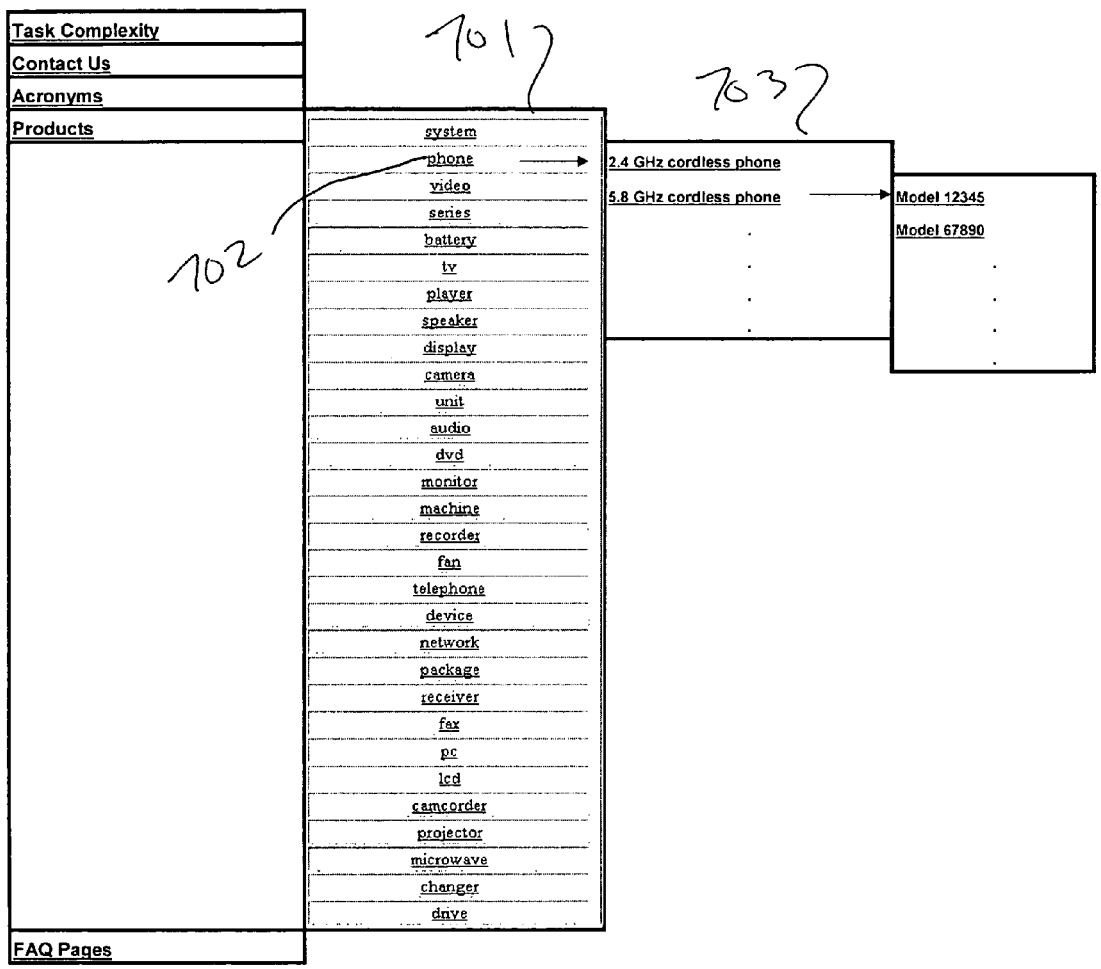
FIG. 7 shows an expanded view of a fourth category of the information extracted from a website.

FIGS. 5-7 show how the information collected via the method of FIGS. 1 and 2 may be displayed in a way that enables, for example, a salesperson to quickly obtain a detailed overview of relevant information on a company's website. Specifically, referring to FIG. 5, by clicking on the "Contact Us" 302 link, phone numbers on the site, such as the phone number 18001234567, and e-mail addresses, such as <info@company.com> are shown in field 502. If available, the type of phone number or relevant context information is shown. This information may be displayed, for example, by clicking on the respective phone number. Here, illustratively, the number 18001234567 is clicked to reveal the phrase Customer Service 501, indicating that that phone number is a customer service number. If any further information related to customer service is identified, such as websites, phone numbers or addresses, then that information may be shown by clicking on the phrase Customer Service.

FIG. 6 shows another embodiment whereby acronyms identified as a class of information according to the method of FIG. 1 and FIG. 2 are shown in field 601 when the respective Acronyms link 303 is clicked. Finally, FIG. 7 shows how the products listed on a company's website can be displayed conveniently. Specifically, as was the case with contact information, when the Products link 304 is clicked, an expanded list 701 of product categories is shown in field 701. Then, by clicking on an individual category, such as phone 702, or an item in that category, such as 5.8 GHz Phones, an expanded list of products can be displayed in fields 703 and 704, respectively. One skilled in the art will recognize that any number of categories may be shown in this way by identifying relevant information as described herein above.

Figure 8:
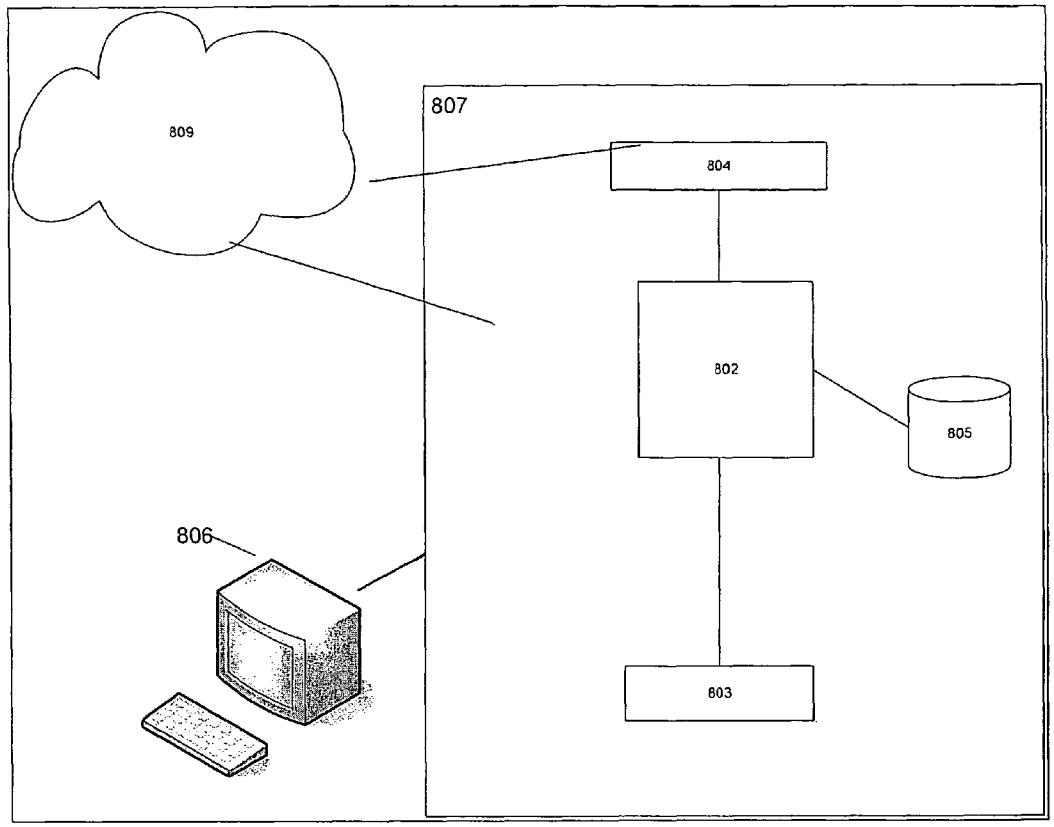
FIG. 8 shows a schematic diagram of a computer useful for analyzing websites in accordance with the principles of the present invention.

FIG. 8 shows a block diagram of a computer that can be used in analyzing websites as well as extracting and displaying information from those websites as described herein above. Referring to FIG. 8, computer 807 may be implemented on any suitable computer adapted to receive, store, and transmit data such as the aforementioned website information described above. Illustrative computer 807 may have, for example, a processor 802 (or multiple processors) which controls the overall operation of the computer 807. Such operation is defined by computer program instructions stored in a memory 803 and executed by processor 802. The memory 803 may be any type of computer readable medium, including without limitation electronic, magnetic, or optical media.

Further, while one memory unit 803 is shown in FIG. 8, it is to be understood that memory unit 803 could comprise multiple memory units, with such memory units comprising any type of memory. Computer 807 also comprises illustrative network interface 804 that is used to interface with, for example, the Internet 809 in order to access websites for analysis. Computer 807 also illustratively comprises a storage medium, such as a computer hard disk drive 805 for storing, for example, data and computer programs adapted for use in accordance with the principles of the present invention as described hereinabove. Finally, computer 807 also illustratively comprises one or more input/output devices, represented in FIG. 8 as terminal 806, for allowing interaction with, for example, a salesperson wishing to analyze websites and view categorized information. One skilled in the art will recognize that computer 807 is merely illustrative in nature and that various hardware and software components may be adapted for equally advantageous use in a computer in accordance with the principles of the present invention. A computer such as the computer shown in FIG. 8 may be used to perform the steps of the methods described here, for example in association with the method of FIGS. 1 and 2, via appropriate software stored in memory and executed on a processor adapted to perform the steps of computer programming instructions stored in that software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, while the methods for data extraction and display described hereinabove are useful for a salesperson, they may also be useful by a company in designing a structured web search functionality for that company's website. Used in this manner, a company's customer, for example, could search a website and extract relevant information in a structured, cascaded fashion as described herein. One skilled in the art will be able to devise numerous different uses for the extraction and display methods in accordance with the principles of the present invention.

The invention claimed is:

1. A method for characterizing a plurality of extensible markup language documents, the method comprising:
    extracting a plurality of blocks of information from the plurality of extensible markup language documents;
    assigning a block of information in the plurality of blocks of information to a task complexity category in a plurality of categories, the block of information comprising a value indicative of a number of extensible markup language documents in the plurality of extensible markup language documents and a value indicative of a number of links associated with the plurality of extensible markup language documents;
    associating a task complexity with the plurality of extensible markup language documents based on the block of information and a structural hierarchy of the plurality of extensible markup language documents; and
    characterizing the plurality of extensible markup language documents based on the task complexity.

2. The method of claim 1 wherein each of the plurality of extensible markup language documents comprises a link to another extensible markup language document of the plurality of extensible markup language documents.

3. The method of claim 2 further comprising:
    traversing the plurality of extensible markup language documents by following each link of the plurality of extensible markup language documents.

4. The method of claim 1 further comprising:
    parsing the plurality of extensible markup language documents to determine the structural hierarchy of the plurality of extensible markup language documents.

5. The method of claim 4 wherein parsing the plurality of extensible markup language documents to determine a structural hierarchy of the plurality of extensible markup language documents comprises:
    parsing the plurality of extensible markup language documents using document object model parsing.

6. The method of claim 4 wherein parsing the plurality of extensible markup language documents to determine a structural hierarchy of the plurality of extensible markup language documents comprises:
    downloading the plurality of extensible markup language documents to a local disk.

7. The method of claim 4 further comprising:
    displaying the structural hierarchy of the plurality of extensible markup language documents.

8. An apparatus for characterizing a plurality of extensible markup language documents, the apparatus comprising:
    a processor; and
    a memory communicatively coupled to the processor, the memory to store computer program instructions, the computer program instructions when executed on the processor cause the processor to perform operations comprising:
        extracting a plurality of blocks of information from the plurality of extensible markup language documents;
        assigning a block of information in the plurality of blocks of information to a task complexity category in a plurality of categories, the block of information comprising a value indicative of a number of extensible markup language documents in the plurality of extensible markup language documents and a value indicative of a number of links associated with the plurality of extensible markup language documents;
        associating a task complexity with the plurality of extensible markup language documents based on the block of information and a structural hierarchy of the plurality of extensible markup language documents; and
        characterizing the plurality of extensible markup language documents based on the task complexity.

9. The apparatus of claim 8 wherein each of the plurality of extensible markup language documents comprises a link to another extensible markup language document of the plurality of extensible markup language documents.

10. The apparatus of claim 9, the operations further comprising:
    traversing the plurality of extensible markup language documents by following each link of the plurality of extensible markup language documents.

11. The apparatus of claim 8, the operations further comprising:
    parsing the plurality of extensible markup language documents to determine the structural hierarchy of the plurality of extensible markup language documents.

12. The apparatus of claim 11 wherein parsing the plurality of extensible markup language documents to determine a structural hierarchy of the plurality of extensible markup language documents comprises:

parsing the plurality of extensible markup language documents using document object model parsing.

13. The apparatus of claim 11 wherein parsing the plurality of extensible markup language documents to determine a structural hierarchy of the plurality of extensible markup language documents comprises:

downloading the plurality of extensible markup language documents to a local disk.

14. The apparatus of claim 11, the operations further comprising:

displaying the structural hierarchy of the plurality of extensible markup language documents.

15. A computer readable storage device storing computer program instructions for characterizing a plurality of extensible markup language documents, the computer program instructions when executed on a processor, cause the processor to perform operations comprising:

extracting a plurality of blocks of information from the plurality of extensible markup language documents;

assigning a block of information in the plurality of blocks of information to a task complexity category in a plurality of categories, the block of information comprising a value indicative of a number of extensible markup language documents in the plurality of extensible markup language documents and a value indicative of a number of links associated with the plurality of extensible markup language documents;

associating a task complexity with the plurality of extensible markup language documents based on the block of information and a structural hierarchy of the plurality of extensible markup language documents; and characterizing the plurality of extensible markup language documents based on the task complexity.

16. The computer readable storage device of claim 15 wherein each of the plurality of extensible markup language documents comprises a link to another extensible markup language document of the plurality of extensible markup language documents.

17. The computer readable storage device of claim 16, the operations further comprising:

traversing the plurality of extensible markup language documents by following each link of the plurality of extensible markup language documents.

18. The computer readable storage device of claim 15, the operations further comprising:

parsing the plurality of extensible markup language documents to determine the structural hierarchy of the plurality of extensible markup language documents.

19. The computer readable storage device of claim 18 wherein parsing the plurality of extensible markup language documents to determine a structural hierarchy of the plurality of extensible markup language documents comprises:

parsing the plurality of extensible markup language documents using document object model parsing.

20. The computer readable storage device of claim 18 wherein parsing the plurality of extensible markup language documents to determine a structural hierarchy of the plurality of extensible markup language documents comprises:

downloading the plurality of extensible markup language documents to a local disk.

* * * * *

UNITED STATES PATENT AND TRADEMARK OFFICE
CERTIFICATE OF CORRECTION

| | | |
|---|---|---|
| PATENT NO. | : 8,560,518 B2 | Page 1 of 1 |
| APPLICATION NO. | : 13/690444 | |
| DATED | : October 15, 2013 | |
| INVENTOR(S) | : Srinivas Bangalore et al. | |

It is certified that error appears in the above-identified patent and that said Letters Patent is hereby corrected as shown below:

On the title page, below the item (*) Notice, insert --This patent is subject to a terminal disclaimer.--

On the title page, in item (45) Date of Patent, "Oct. 15, 2013" should be changed to --*Oct. 15, 2013--

Signed and Sealed this
Eighteenth Day of February, 2014

Michelle K. Lee
*Deputy Director of the United States Patent and Trademark Office*